C. VAN SMITH.
VEHICLE WHEEL TIRE.
APPLICATION FILED SEPT. 3, 1910.
1,040,471.
Patented Oct. 8, 1912.
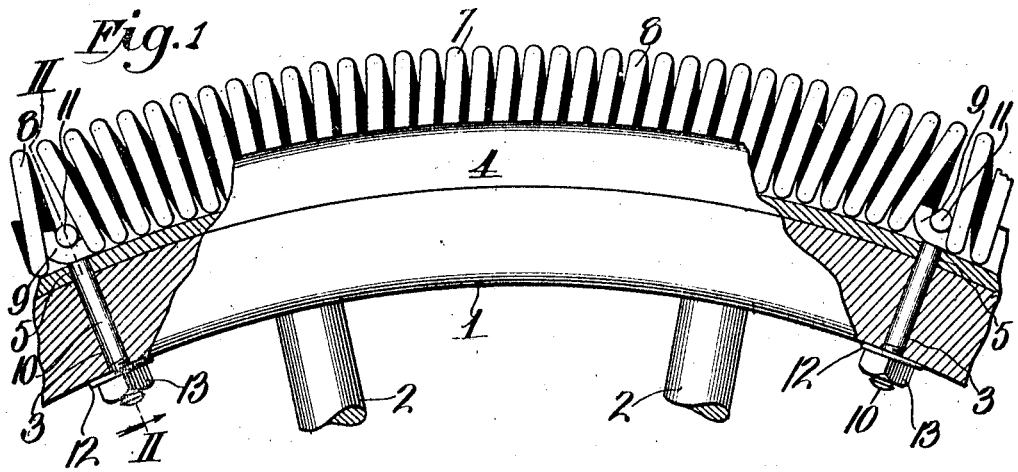
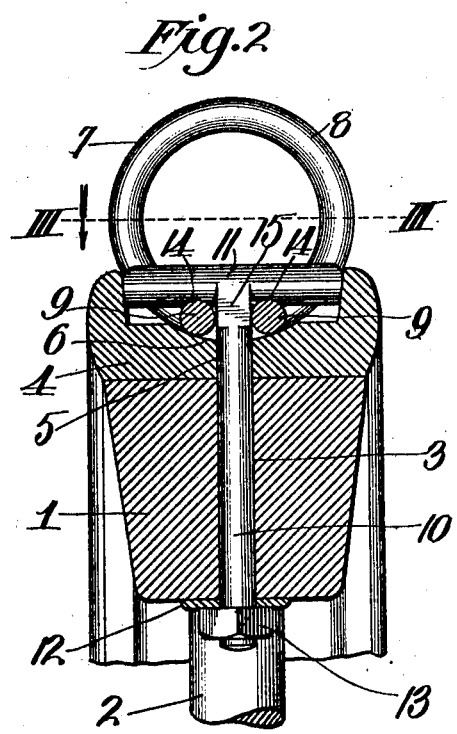
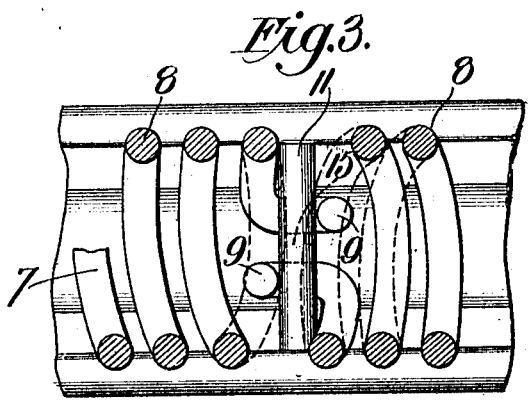
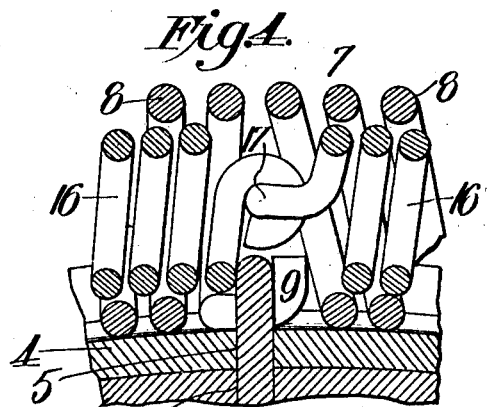
Witnesses
Frank P. Glor
H. C. Rodgers
Inventor
C. Van Smith
By George F. Thorpe Atty.

UNITED STATES PATENT OFFICE.

CHARLES VAN SMITH, OF KANSAS CITY, MISSOURI.

VEHICLE WHEEL-TIRE.

1,040,471.  Specification of Letters Patent.  Patented Oct. 8, 1912.

Application filed September 3, 1910. Serial No. 580,445.

*To all whom it may concern:*

Be it known that I, CHARLES VAN SMITH, a citizen of the United States, residing at Kansas City, in the county of Jackson and State of Missouri, have invented certain new and useful Improvements in Vehicle Wheel-Tires, of which the following is a specification.

This invention relates to vehicle wheel tires and my object is to produce a resilient or cushion non-skidding tire, of simple, strong, durable and inexpensive construction.

A further object is to produce a tire which can be easily and quickly secured in position or repaired by an unskilled person.

With these objects in view the invention consists in certain novel and peculiar features of construction and combination of parts as hereinafter described and claimed; and in order that it may be fully understood reference is to be had to the accompanying drawing, in which—

Figure 1, is a view partly in side elevation and partly in central section of a segment of a wheel equipped with a tire embodying my invention. Fig. 2, is an enlarged section on the line II—II of Fig. 1. Fig. 3, is an enlarged circumferential section on the line III—III of Fig. 2. Fig. 4, is a vertical section of a part of the wheel and tire, with the latter equipped with a reinforcing or stiffening auxiliary spring.

In the said drawing, 1 indicates the felly and 2 the spokes of a wheel of any suitable or preferred type of construction, and at suitable intervals the felly is provided with radial holes 3.

4 is an externally channeled rim adapted to be shrunk or otherwise rigidly secured upon the felly and provided with holes 5 in alinement with holes 3 of the felly, the rim being preferably formed with a circumferential groove 6 of segmental form in cross section.

Arranged circumferentially of the wheel and fitting snugly in the channel of the rim and in the groove 6 at the bottom of the channel, is a coiled wire tire 7 consisting of a plurality of members 8 formed at their ends with upturned hooks 9, the adjacent hooks of contiguous springs extending circumferentially with respect to the rim and being located at opposite sides of and spaced apart a distance substantially equal to the diameter of the holes 5, to receive between them the shank 10 of a T-bolt, the head 11 of the same extending transversely of and fitting in the channel of the rim and in said hooks 9, a washer 12 and nut 13, engaging the inner end of the bolt and applying pressure on the felly to clamp the tire firmly to the rim and interlock the members of the former together. The tire members 8 will be of such length that to secure them together they must be stretched to place them under tension, this tensioning effecting a spacing apart of their convolutions and giving them a better tractional engagement with the ground. Furthermore, by spacing the convolutions apart slightly, there is less chance for mud to wedge between them so tightly as to make the periphery of the tire practically smooth and thus reduce its tractional grip upon the roadway. Another advantage of having the convolutions spaced apart, is that mud, caked and hardened within the tire, can be readily and quickly dislodged by projecting a stream of water on it, or the tire may be left to clean itself by repeatedly crushing hardened mud within it, until fine enough to sift through the interstices between the convolutions. In the preferred construction the heads of the bolts are provided with recesses 14 to provide for a more extended grip on hooks 9, and adjacent to the heads 11, the stems of the bolts are preferably squared as at 15, where they fit between the hooks to assist in guarding against swivel movement of the bolts.

If desired the tire may be stiffened by the use of an inner coiled spring consisting of similar sections 16, terminating in engaging hooks 17, shown in Fig. 4, the convolutions of the springs 16 being preferably of opposite pitch to the convolutions of members 8 to more effectively brace and stiffen the latter than would be the case if the inner and outer springs were both pitched in the same direction, it being understood that the difference of pitch is not so noticeable at one side of each connecting point of adjacent springs because at such points the convolutions are warped somewhat out of their natural positions in order that the endmost convolutions of adjacent spring members shall be disposed apart at the periphery of the tire a distance about equal to that between the other convolutions, as will be apparent by reference to Figs. 1 and 4.

A tire of the type described can be readily and easily secured in position and the breakage or other material injury of a member can be remedied at small cost by removing such member and replacing it with a new one.

In practice the wheels at one side of the vehicle will preferably be provided with right hand springs and the wheels at the opposite side with left-hand springs and thus reduce to the minimum the possibility of the vehicle skidding in either direction.

A tire of the character described tends to absorb the shock or vibration incident to travel, diminishes chance of injury to the vehicle by reason of its efficient tractional grip upon the roadway, and is not only cheaper than a pneumatic or solid tire but is far more durable.

From the above description it will be apparent that I have produced a tire for vehicle wheels possessing the features of advantage enumerated as desirable and I wish it to be understood that I reserve the right to make all changes properly falling within the spirit and scope of the appended claim.

I claim:—

The combination with a vehicle wheel of a channeled rim secured on the felly of the wheel and a coiled spring tire circumferentially surrounding and fitting in the channeled rim and consisting of a plurality of members arranged end to end and terminating at their adjacent ends in hooks, and fastening devices extending radially through the rim and felly between the adjacent hooks of contiguous spring members and provided with transverse heads fitting in the channel of the rim and bearing down upon said hooks, and means engaging the inner ends of said fastening devices to secure them in fixed relation to the rim and felly.

In testimony whereof I affix my signature, in the presence of two witnesses.

CHARLES VAN SMITH.

Witnesses:
HELEN C. RODGERS,
G. Y. THORPE.